United States Patent Office 2,789,111
Patented Apr. 16, 1957

2,789,111

PROCESS FOR THE MANUFACTURE OF OCTAHYDROISOQUINOLINE DERIVATIVES AND ACID ADDITION SALTS THEREOF

Rudolf Grewe, Kiel, Germany, assignor to Hoffmann-La Roche Inc., Nutley, N. J., a corporation of New Jersey No Drawing. Application June 11, 1953,
Serial No. 361,073

Claims priority, application Germany June 16, 1952

7 Claims. (Cl. 260—286)

The invention provides a new process for the manufacture of substituted or unsubstituted 1-benzyl-2-methyl-1,2,3,4,5,6,7,8-octahydroisoquinolines.

The new process according to the invention comprises reacting N-methyl-β-cyclohexen-(1)-yl-ethyl-amine with a substituted or unsubstituted phenylacetaldehyde or the disulfite addition compound thereof, treating the unsaturated tertiary base obtained with a strong mineral acid, whereupon the octahydroisoquinoline derivative formed may be converted into an acid addition salt. Preferred substituents are hydroxy or lower alkyl and alkoxy groups, such as more particularly methyl, ethyl, methoxy or ethoxy radicals.

The reaction between the N-methyl-β-cyclohexen-(1)-yl-ethyl-amine and the substituted or unsubstituted phenylacetaldehyde is advantageously carried out in an inert solvent, such as ether, and it is recommendable to add to the reaction mixture an alkaline condensing agent, preferably water-free potassium carbonate. The reaction mixture is advantageously cooled with ice and then stirred for several hours at room temperature.

The intermediate reaction products are yellow oils, which may be distilled in vacuo, or crystallized substances which are stable in the absence of air, but which rapidly become dark colored when exposed to the air. They may be assigned the structure of a substituted or unsubstituted styryl-cyclohexenylethyl-methylamine, which structure is made probable by the fact that each mol of these unsaturated tertiary amines is, upon catalytic hydrogenation, able to absorb two mol of hydrogen, being thereby transformed into saturated tertiary amines.

The cyclization of the said unsaturated tertiary bases is performed preferably by heating the same with strong mineral acids, e. g. 87% phosphoric acid or 50% sulfuric acid. The products thus obtained are substituted or unsubstituted 1-benzyl-2-methyl-1,2,3,4,5,6,7,8-octahydroisoquinolines. If instead of heating with mineral acids, the unsaturated tertiary bases are treated at room temperature with the said acids, intermediate products may be isolated. The said intermediate products are both an isomeric substituted or unsubstituted 1-benzyl-2-methyl-1,2,3,4,6,7,8,9-octahydroisoquinoline and a substituted or unsubstituted 1-benzyl-2-methyl-10-hydroxy-decahydroisoquinoline. These intermediates may in turn be transposed or dehydrated by heating with strong mineral acids to form the desired substituted or unsubstituted 1,2,3,4,5,6,7,8-octahydroisoquinoline.

The 1,2,3,4,5,6,7,8-octahydroisoquinoline derivatives are oils which may be distilled and which may be transformed into crystallized acid addition salts. The said compounds may be used as spasmolytics and as intermediates for the preparation of other drugs particularly N-methyl-morphinanes.

Example 1

120.0 parts by weight of phenylacetaldehyde and 139.0 parts by weight of N-methyl-β-cyclohexen-(1)-yl-ethyl-amine are separately dissolved in 300 parts by volume each of absolute ether. To the amine solution obtained are added 80.0 parts by weight of water-free potassium carbonate, whereupon the aldehyde solution is introduced dropwise, within 15 minutes and with cooling, into the amine solution. The mixture is kept standing at room temperature for 12 hours and is being shaken from time time. It is then filtered, the ether is evaporated and the residue is distilled. The unsaturated tertiary amine obtained boils at 138° C./0.06 mm. Hg.

20 parts by weight of the above unsaturated tertiary base are heated for 8 hours on a water bath with 200 parts by volume of 87.6% phosphoric acid. The reaction mixture is diluted with 1500 parts by volume of water and extracted with ether, whereupon the acid aqueous solution is made alkaline with 10% sodium hydroxide solution. The free base is then taken up in ether and distilled. The 1 - benzyl - 2-methyl-1,2,3,4,5,6,7,8-octahydroisoquinoline boils at 108° C./0.01 mm. Hg. After having been recrystallized in alcohol, the picrate thereof melts at 133–134° C. and the hydrochloride at 195° C.

Alternatively, the following procedures may be followed:

A. 4.0 parts by weight of the above unsaturated tertiary base are dissolved in 40 parts by volume of 87% phosphoric acid. The solution is kept standing for 72 hours at room temperature, thereupon diluted with 300 parts by volume of water and extracted with ether. The acid aqueous solution is made alkaline with dilute hydroxide solution and extracted with ether. After having distilled off the ether, the residue is distilled. The fraction, which distills over at 125° C. and a pressure of 0.01 mm. Hg in the form of a colorless oil, is 1-benzyl-2-methyl-1,2,3,4,6,-7,8,9-octahydroisoquinoline. Its picrate melts at 151–152° C. (crystallized in alcohol). 6.5 parts by weight of 1 - benzyl - 2-methyl-1,2,3,4,6,7,8,9-octahydroisoquinoline are dissolved in 200 parts by volume of 2 N hydrochloric acid. To this solution are added 50 parts by volume of concentrated hydrochloric acid and the whole is refluxed for 4 hours. The mixture is made alkaline with dilute sodium hydroxide solution and the base is extracted with ether. The ether is evaporated and the residual oil distilled at a bath temperature of 120° C. and under a pressure of 0.01 mm. Hg to yield 1-benzyl-2-methyl-1,2,3,4,5,-6,7,8-octahydroisoquinoline. After having been recrystallized in alcohol, the picrate thereof melts at 133–134° C.

B. A mixture of 3.34 parts by weight of unsaturated tertiary base and 33 parts by volume of 50% sulfuric acid are kept standing for 20 hours at room temperature. Then the mixture is diluted with 150 parts by volume of water and refluxed for 1 hour. The solution is extracted with ether and the acid aqueous solution made alkaline by means of 30% sodium hydroxide. The oil which has seprated is taken up in ether. The ether is evaporated and the residual viscous yellowish oil is dissolved in 10 parts by volume of petroleum ether (boiling range 60–80° C.). The 1-benzyl-2-methyl-10-hydroxy-decahydroisoquinoline separates in the form of thick crystals and, after having been recrystallized in petroleum ether, melts at 103–104° C.; the picrate thereof melts at 138–139° C. (crystallized in alcohol). 0.45 part by weight of 1-benzyl-2-methyl-10-hydroxy-decahydroisoquinoline are dissolved in 10 parts by volume of concentrated hydrochloric acid and refluxed for 4 hours. The solution is made alkaline with 20% sodium hydroxide solution, while cooling with ice, and then extracted with ether. After having distilled off the ether, the residue is distilled under a pressure of 0.03 mm. Hg and a bath temperature of 120° C. to yield 1-benzyl-2- methyl-1,2,3,4,5,6,7,8-betahydroisoquinoline. The picrate of the latter melts at 132–134° C.

*Example 2*

18 parts by weight of p-methoxy-phenyl-acetaldehyde disulfite addition compound are humidified with 10 parts by volume of water and a solution of 8.5 parts by weight of N-methyl-β-cyclohexen-(1)-yl-ethyl-amine in 500 parts by volume of ether is added thereto. While stirring and cooling, a solution of 20 parts by weight of potassium carbonate in 40 parts by volume of water is added thereto dropwise within 1 hour. The mixture is stirred until everything has gone into solution, 100 parts by volume of water being added if necessary. The ether solution is separated off, dried with potassium carbonate, the ether is removed and the residue is distilled in vacuo. The unsaturated tertiary amine is an oil which boils under a pressure of 0.02 mm. Hg at a bath temperature of 182° C.

1 part by weight of this unsaturated amine is heated with 10 parts by weight of 50% sulfuric acid during 8 hours on a water bath. The mixture is diluted with water, extracted with ether, whereupon the aqueous layer is made alkaline and the base which separates is taken up in ether. After having dried and distilled off the ether, the residue is distilled in vacuo. The 1-(4'-methoxy - benzyl) - 2-methyl-1,2,3,4,5,6,7,8-octahydroisoquinoline distills at 178° C./0.03 mm. Hg. The picrate melts at 171° C.

Alternatively, the following procedure may be followed: 1 part by weight of the above unsaturated tertiary base is dissolved in 6 parts by weight of 87% phosphoric acid and the solution is stored for 72 hours at room temperature. The mixture is diluted with water, extracted with ether and the aqueous layer is made alkaline, whereupon the base which separates is taken up in ether. The ether is evaporated and the residue distilled. The 1-(4'-methoxy - benzyl) - 2 - methyl-1,2,3,4,6,7,8,9-octahydro-isoquinoline obtained boils at 178° C./0.03 mm. Hg; the picrate thereof melts at 149° C. 1 part by weight of the said isoquinoline derivative is refluxed for 3 hours with 20 parts by volume of 20% hydrochloric acid. The solution is made alkaline and extracted with ether. After having distilled off the ether, the residual base distills at 178° C./0.03 mm. Hg and yields 1-(4'-methoxy-benzyl)-2-methyl-1,2,3,4,5,6,7,8-octahydroisoquinoline. The picrate thereof melts at 172° C.

*Example 3*

10 parts by weight of 4-methoxy-3-benzyloxy-phenyl-acetaldehyde are dissolved in 20 parts by volume of methanol and a solution of the equivalent amount of N-methyl-β-cyclohexen-(1)-yl-ethylamine in 20 parts by volume of methanol is added thereto. The unsaturated tertiary amine of melting point 76° C. crystallizes immediately in excellent yield.

10 parts by weight of the said unsaturated amine are dissolved in 100 parts by volume of 87% phosphoric acid. The solution is stored 3 days at room temperature, whereupon it is diluted with water and filtered. The filtrate is adjusted to pH 6 by the addition of concentrated ammonia, it is then extracted with ether and the aqueous layer is made distinctly alkaline by means of excess ammonia. The aqueous solution is extracted with ether, the ether solution is evaporated and the residue is distilled in vacuo. The product of the reaction distills slowly under a pressure of 0.03 mm. Hg at a bath temperature of 140° C. It solidifies in crystallized form in the recipient and is purified by recrystallization in dilute ethanol; melting point 139° C. (the benzyl group has split off during the cyclizing procedure).

I claim:

1. A process which comprises heating a compound selected from the class consisting of 1-benzyl-2-methyl-1,2,3,4,6,7,8,9-octahydroisoquinoline and such of its derivatives as are constituted by said 1-benzyl-2-methyl-1,2,3,4,6,7,8,9-octahydroisoquinoline substituted in the phenyl nucleus thereof only by a member selected from the group of lower alkyl lower alkoxy, hydroxy and benzyloxy radicals, and said addition salts thereof, with a strong mineral acid, thereby producing the corresponding 1 - benzyl-2-methyl-1,2,3,4,5,6,7,8-octahydroisoquinoline.

2. A process which comprises condensing N-methyl-β-cyclohexen-(1)-yl-ethyl-amine with a reactant selected from the class consisting of phenylacetaldehyde and such of its derivatives as are constituted by said phenylacetaldehyde substituted in the phenyl nucleus thereof only by a member selected from the group of lower alkyl, lower alkoxy, hydroxy and benzyloxy radicals, and disulfite addition compounds thereof; and treating the unsaturated tertiary base obtained with a strong mineral acid.

3. A compound selected from the class consisting of N - styryl-N-[β-cyclohexen-(1)-yl-ethyl]-N-methylamine and such of its derivatives as are constituted by said N-styryl - N - [β-cyclohexen-(1)-yl-ethyl]-N-methyl-amine substituted in the phenyl nucleus thereof only by a member selected from the group of lower alkyl, lower alkoxy, hydroxy and benzyloxy radicals, and acid addition salts thereof.

4. A process of making a compound in claim 3 which comprises condensing N-methyl-β-cyclohexen-(1)-yl-ethyl-amine with a reactant selected from the class consisting of phenylacetaldehyde and such of its derivatives as are constituted by said phenylacetaldehyde substituted in the phenyl nucleus thereof only by a member selected from the group of lower alkyl, lower alkoxy, hydroxy and benzyloxy radicals, and disulfite addition compounds thereof.

5. A process which comprises heating a compound defined in claim 3 with a strong mineral acid, thereby producing a 1-benzyl-2-methyl-1,2,3,4,5,6,7,8-octahydroisoquinoline.

6. A process which comprises treating a compound defined in claim 3 with sulfuric acid of about 50 percent concentration at about room temperature, thereby producing a 1 - benzyl-2-methyl-10-hydroxy - decahydroisoquinoline.

7. A process which comprises treating a compound defined in claim 3 with phosphoric acid of about 87 percent concentration at about room temperature, thereby producing a 1-benzyl-2-methyl-1,2,3,4,6,7,8,9-octahydroisoquinoline.

References Cited in the file of this patent

UNITED STATES PATENTS 2,006,114    Rosenmund et al. _____ June 25, 1935

FOREIGN PATENTS 662,830    Great Britain _____ Dec. 12, 1951

OTHER REFERENCES

Adams: Organic Reactions, John Wiley Inc., New York, 1948, vol. IV, page 250.

Adams: Organic Reactions, John Wiley Inc., New York, 1951, vol. VI, page 192.

Grewe: Analen, vol. 564, pp. 161–198 (1949).